United States Patent
Acre et al.

(10) Patent No.: US 6,467,538 B1
(45) Date of Patent: Oct. 22, 2002

(54) VEHICLE WITH RAPID HEATER WARM UP

(75) Inventors: James A Acre, Barker; Wayne Oliver Forrest, Gasport, both of NY (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/691,871

(22) Filed: Oct. 19, 2000

Related U.S. Application Data

(60) Provisional application No. 60/184,038, filed on Feb. 22, 2000.

(51) Int. Cl.$^7$ ............................ B60H 1/00; B60K 11/06
(52) U.S. Cl. ...................... 165/266; 165/44; 165/271; 180/68.2
(58) Field of Search ......................... 165/41, 44, 202, 165/266, 271, 97; 237/12.3 R, 12.3 A, 12.3 B; 180/68.2

(56) References Cited

U.S. PATENT DOCUMENTS

| | | | | | |
|---|---|---|---|---|---|
| 1,553,808 A | * | 9/1925 | Eriksson | ................... | 165/44 |
| 1,754,257 A | * | 4/1930 | Britt | ................... | 165/44 |
| 2,221,985 A | * | 11/1940 | McGinley | ................... | 165/97 X |
| 2,270,823 A | * | 1/1942 | Meyerhoefer | ................... | 165/97 |
| 3,131,864 A | * | 5/1964 | Young | ................... | 237/12.3 B |
| 3,523,644 A | * | 8/1970 | Kozinski | ................... | 237/12.3 B |
| 3,853,270 A | * | 12/1974 | Prebil | ................... | 237/12.3 B |
| 3,941,185 A | * | 3/1976 | Henning | ................... | 165/97 X |
| 5,050,667 A | * | 9/1991 | Berner et al. | ................... | 165/97 X |
| 5,799,728 A | * | 9/1998 | Blume | ................... | 165/97 X |
| 5,894,987 A | * | 4/1999 | Layne et al. | ................... | 165/44 |

FOREIGN PATENT DOCUMENTS

| | | | | |
|---|---|---|---|---|
| DE | 1112094 | * 8/1961 | ................... | 165/97 |
| DE | 37 35 726 A1 | * 5/1989 | ................... | 165/97 |
| DE | 42 28 586 A1 | * 8/1993 | ................... | 165/97 |
| DE | 195 21 621 A1 | * 12/1996 | ................... | 165/97 |
| JP | 61-86598 | * 5/1986 | ................... | 165/97 |
| NL | 166433 | * 1/1970 | ................... | 165/97 |

* cited by examiner

*Primary Examiner*—Ljiljana Ciric
(74) *Attorney, Agent, or Firm*—Patrick M. Griffin

(57) ABSTRACT

A vehicle heater of the type that uses diverted engine coolant is provided with an accelerated warm up process that takes the coolant to a temperature suitable for passenger space heating more quickly. The fan that normally pulls outside air through the front end grill is, after vehicle start up, run in reverse, so as to actually retard the flow of air through the grill. The net effect of a separate structure that physically blocks air flow is achieved merely by using existing components in a new way.

4 Claims, 3 Drawing Sheets

VEHICLE WITH RAPID HEATER WARM UP

RELATED APPLICATION

This application claims the benefit of prior provisional application Serial No. 60/184,038 filed Feb. 22, 2000.

TECHNICAL FIELD

This invention relates to automotive heating systems in general, and specifically to means for speeding up the warm up process for a heating system.

BACKGROUND OF THE INVENTION

Vehicle heating systems, at least those on internal combustion vehicles, generally divert a portion of the liquid coolant used to cool the engine to a heater core located in or near the interior, or cabin, of the vehicle. Air is blown over the heater core into the vehicle which, of course, can be no warmer than, and warm no sooner than, the liquid coolant in the heater core. The liquid coolant in the heater core, in turn, is substantially only as warm as, and becomes warm no sooner than, the coolant in the cooling jacket of the engine block from which it is diverted. Cabin heat is called for by the vehicle operator on a cold day, of course, but when the engine first starts up on a cold day, the engine block and coolant are naturally as cold as the ambient, and even a stationary vehicle will not achieve hot engine coolant right away. Since the vehicle is typically driven off soon after starting up, the warm up process is delayed even longer. While the radiator and cooling fan do not operate to cool the engine until it is hot, so called ram air enters the engine compartment through and under the grill, and blows forcefully over the engine block and its coolant jacket, especially at high speed. This tends to cool the engine block and delay the warm up process considerably.

Known devices and methods used to retard the ram air cooling process after cold start up generally include physically movable, additional vehicle structures, such as shields or louvers, which block the front air openings. These add expense and take up room under the hood. Larger vehicles, such as trucks and busses, actually place a separate screen temporarily over the outside of the grill. These are obviously inconvenient, and would not be considered suitable for a typical passenger vehicle.

SUMMARY OF THE INVENTION

The subject invention provides a means to speed cold start warm up which takes advantage of existing structure, and which operates essentially automatically and invisibly to the vehicle operator.

In the embodiment disclosed, the engine cooling (radiator) fan just behind the vehicle grill is driven by an electric motor, which is an increasingly common alternative to the older belt drive devices. During cold start up conditions, when cabin heat is requested, the fan direction is reversed. Now, rather than assisting air flow through the grill, in the same direction as the natural ram air flow, the fan actually retards or blocks the ram air flow. In effect, the equivalent of a physical blocking shield is temporarily provided, but without the need for a separate structure. When the engine coolant has become sufficiently hot, the fan is returned to normal operation.

BRIEF DESCRIPTION OF THE DRAWINGS

These and other features of the invention will appear from the following written description, and from the drawings, in which.

DESCRIPTION OF THE PREFERRED EMBODIMENT

Figure 1:
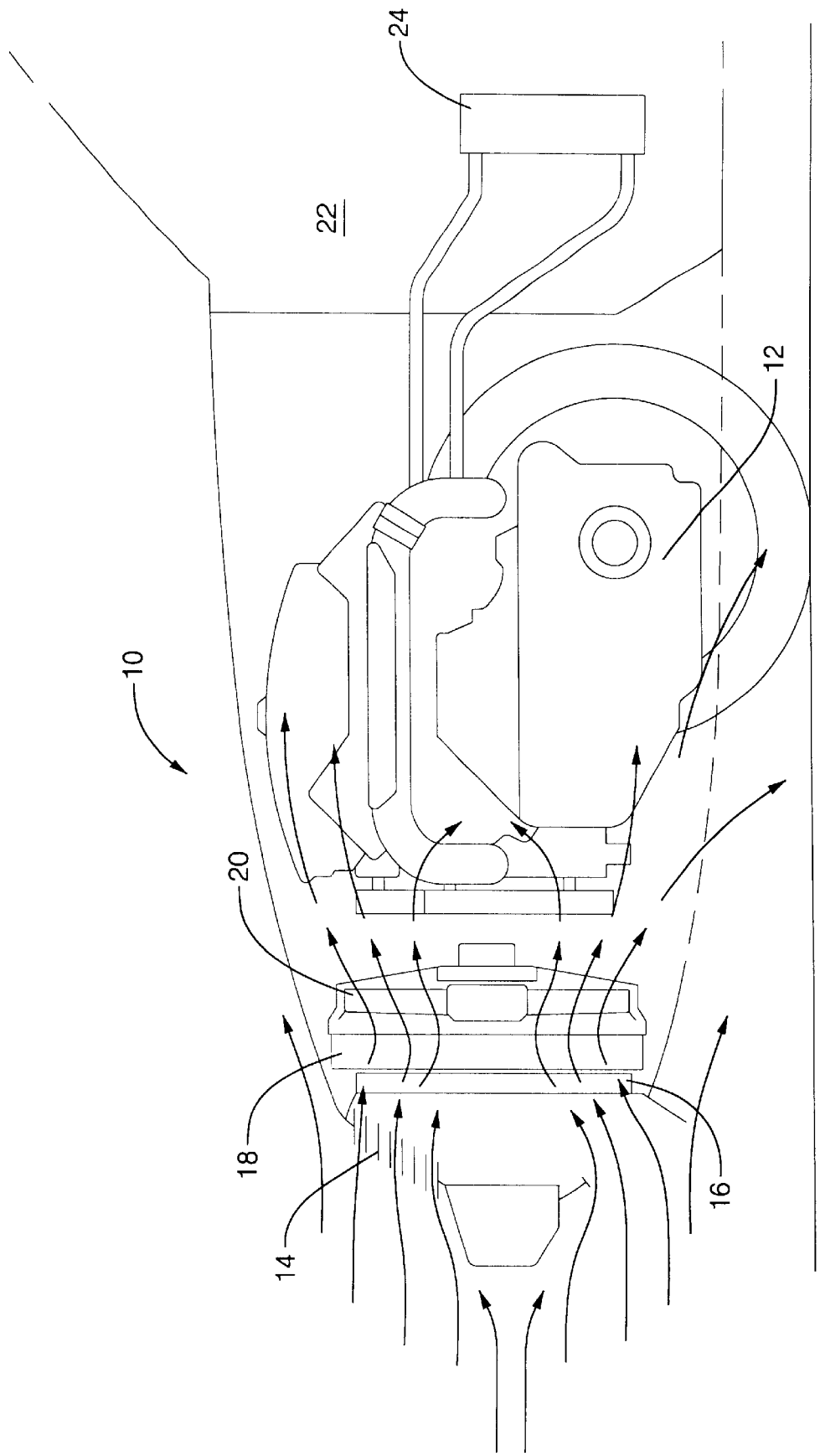
FIG. 1 is a schematic side view of a typical vehicle, showing the normal ram air flow through the engine compartment, when the cooling fan is operating normally.

Referring first to FIG. 1, a typical vehicle, indicated generally at 10, has an engine 12 located in a compartment at the front of the vehicle 10. At the very front of the vehicle, a grill 14 admits ambient, outside air into the engine compartment, and a flow of air also enters through an additional opening 16 below grill 14. Air will naturally be forced through these openings and around the outside of engine 12 simply due to the motion of the vehicle 10, which is referred to as so called ram air. This, of course, will not be sufficient to cool the engine 12 at idle or low speeds, at least for conventional, large engines, which must be liquid cooled. In that regard, engine 12 is formed with internal coolant passages or jackets, not illustrated, through which liquid coolant is pumped and then pumped to and through a radiator 18 mounted behind grill 14. Proximate to radiator 18 (generally just behind, but occasionally in front) is a cooling fan 20 which, being between the engine 12 and the grill 14, assists the natural ram air flow. Fan 20 provides the only, or majority of, the air flow at idle and low vehicle speeds. Air is forced through radiator 18, by fan 20, and coolant is circulated through radiator 18 under conditions where engine cooling is needed. This selective engine cooling is typically achieved by a radiator thermostat that opens at a cooling threshold temperature in the range of 185–195 degrees F. If the engine 12 does not need cooling, however, the fan 20 is not activated by the vehicle control system, and simply allowed to turn freely, or "windmill" as it is sometimes called. The fan 20 will not need to run either when the engine 12 is cold, as at start up, or when the vehicle 10 is moving fast enough that ram air is sufficient to cool radiator 18. Increasingly, in newer vehicle designs, cooling fan 20 is operated by an electric motor, rather than being belt driven, which provides better control, especially at low vehicle speeds and low engine RPMs. Typical air flow through the front end of vehicle 10 is indicated by the arrows. Normally, both the forward vehicle speed, and the operation of the fan 20, act in concert to move air in the direction shown.

Still referring to FIG. 1, a typical vehicle 10 takes advantage of the liquid cooled engine 12 to provide low cost heat to the vehicle interior or cabin 22. A portion of the liquid coolant is diverted from engine 12 to a heater core 24, across which air is blown by a non illustrated fan and into cabin 22. That air is heated only to the extent that heater core 24 and the coolant flowing through it are hotter than the air blown over it, of course. Just after start up, on a cold day, neither the engine 12 nor its coolant is warm. Likewise, coolant diverted to heater core 24 is equally cold, and will not reach temperatures suitable for cabin heating until the coolant in engine 12 has warmed up. The typical thermostats and other controls that operate radiator 18 and its cooling fan 20 do not activate either radiator 18 and fan 20 until engine 12 is hot enough to require cooling, as noted above, so these do not effectively delay warm up. However, as the vehicle 10 moves at speed, just the ram air naturally forced to flow around engine 12 will cool it and the coolant inside it sufficiently to delay the warm up process significantly.

Figure 2:
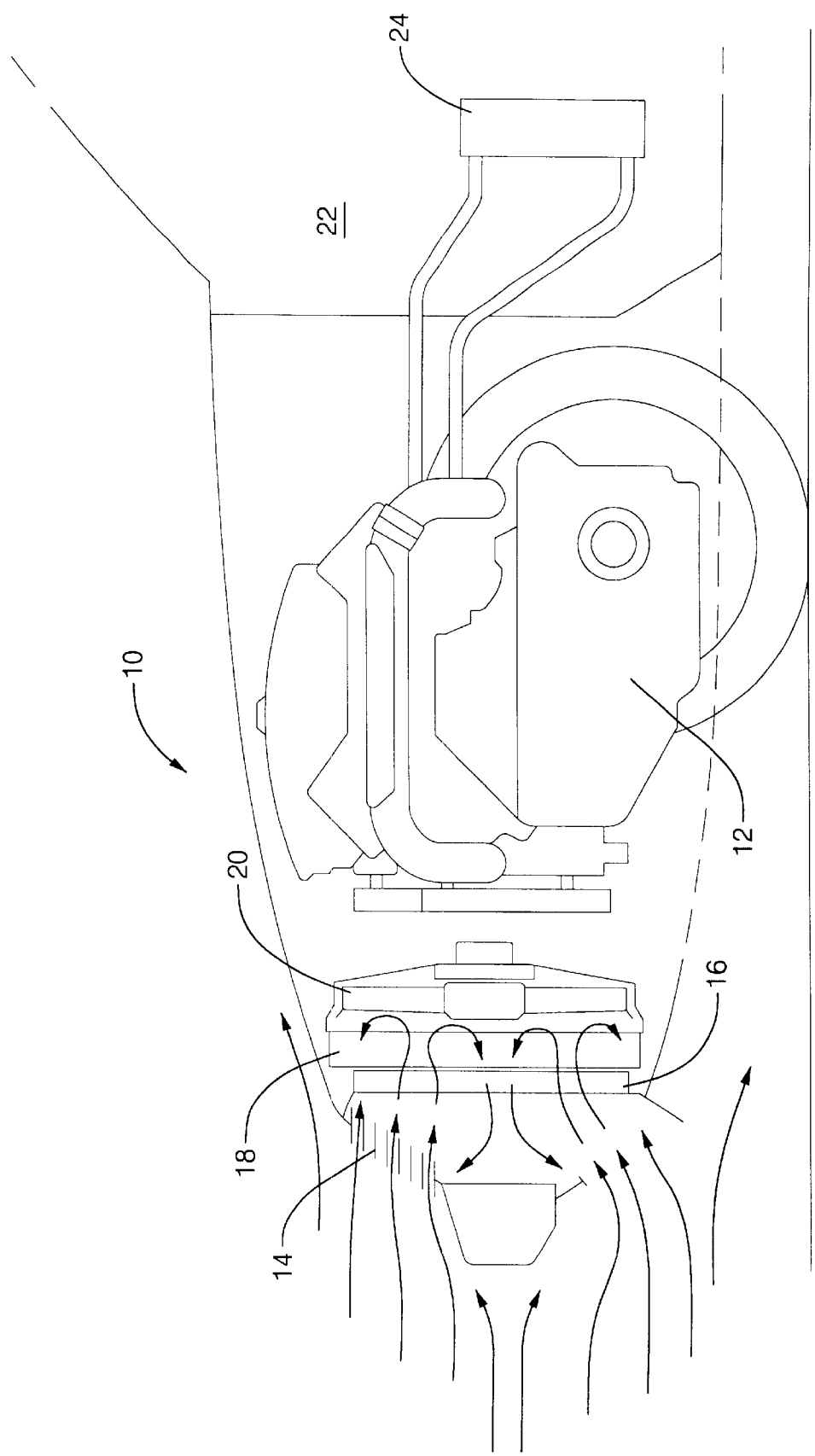
FIG. 2 is a view like FIG. 1, but showing the cooling fan operating in reverse to retard the ram air flow during warm up.

Referring next to FIG. 2, the invention provides a means to temporarily block ram air flow during warm up. In general, the cooling fan 20, normally inoperative during engine warm up, is reversed, and used to oppose the ram air flow. Ideally, this provides a de facto shield that prevents any significant ram air flow. The reversed fan 20 causes ram air to instead "stack up" and flow around, rather than through, grill 14 and opening 16, as indicated by the arrows. At high vehicle speeds, some ram air flow will likely penetrate anyway, but it will still be reduced. Tests have indicated a potential 5 to 10 degree F. improvement in heater discharge temperature at 30 MPH by so using the fan 20 as indicated.

Figure 3:
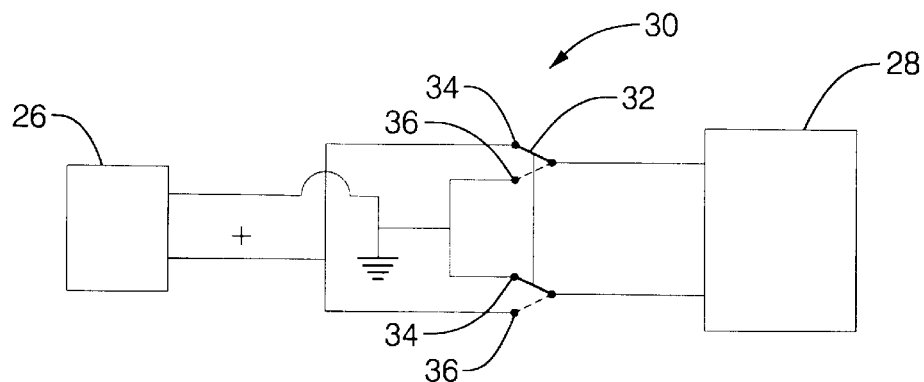
FIG. 3 is a simplified schematic of a possible switch means to operate the cooling fan in reverse.

Referring next to FIG. 3, a schematic circuit diagram of a possible mechanism to reverse fan 20 is illustrated. The vehicle wiring harness is indicated generally at 26, the fan speed control circuits at 28, and these will vary vehicle to vehicle, of course. Interposed between the two is what may be termed a double throw switch, indicated generally at 30, which serves to reverse the rotation direction the fan 20, when desired. The "when desired" conditions are discussed in more detail below. By "double throw," it is meant that a pair of switch elements 32, coupled together as one, switch simultaneously between one set of contacts, 34, that run the fan normally (forward), and another set of contacts, 36, which simply reverse the polarity to the fan speed control circuits 28 and to the motor that drives fan 20. This switching may be done by a relay, for example, which would lend itself well to automatic operation, depending on the particular control scheme. An alternative to the double throw switch would be two single throw relays that were electronically coupled. Reverse fan operation could be achieved with a motor of the electronically commutated type, such as DC-brushless motors or switched reluctance motors, within the control circuits 28. A possible control scheme is described next.

Figure 4:
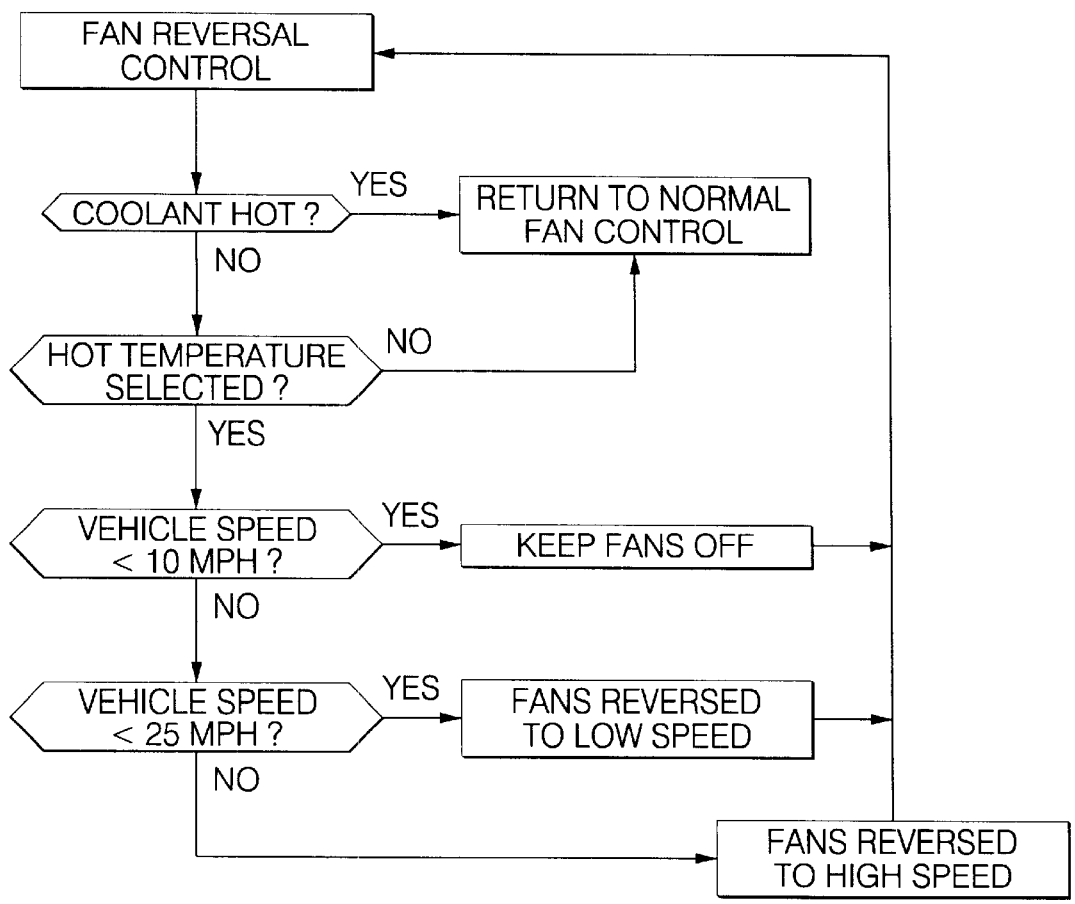
FIG. 4 is a flow chart showing a control scheme for the invention.

Referring next to FIG. 4, one possible control scheme flow chart or "decision algorithm" is illustrated. At the time of vehicle start up, an initial controller inquiry would be whether the engine coolant was hotter than a predetermined threshold temperature, a temperature considered hot enough to efficiently operate the heater core 24. Such a heater threshold temperature could be conveniently set to be 5 to 10 degrees below the typical radiator thermostat opening temperature noted above. This initial inquiry is indicated by the decision box labeled "coolant hot?" At start up, of course, it is unlikely that the engine coolant would be hot, unless the vehicle had been sitting for only a short time. If the answer is yes, however, the vehicle reverts to normal fan control, meaning normal, forward fan operation. If the answer is no, indicating that the coolant is not up to the threshold heater temperature, the next inquiry is whether the vehicle operator has requested cabin heating, as indicated in the decision box "hot temperature selected?". If the answer is no, again, normal fan control takes over, but if yes, the next inquiry regards vehicle speed. If the vehicle speed is less than 10 mph, simply keeping the fan 20 turned off will assist sufficiently is shortening the engine coolant warm up time, since ram air is not significant at that low speed. If the speed is greater than 10 mph, but less than 25, a low speed reversal of fan 20 is sufficient to resist the ram air flow. If the speed is greater than 25 mph, a high speed reversal of fan 20 is called for. Returning then to the original control inquiry, once the coolant is hot, the system reverts to normal fan control. A controller could be set up to run through the scheme illustrated periodically, potentially over increments of only a few seconds, if desired, or almost continually, beginning after start up and until the desired coolant heat threshold was reached. It could also be an advantage to "time out" the control scheme indicated after a predefined time interval after engine start up, to assure that the fan 20 does not run in reverse indefinitely in a case where the coolant temperature has not risen for some reason.

The net result of the method disclosed is a faster warm up rate, with the addition of very little extra structure and components, beyond the simple controls illustrated. Not only is passenger comfort enhanced by the faster warm up, but windshield defrost time would be enhanced by the quicker heating of heater core 24. Other benefits include improved gas mileage, due to the fact that the vehicle front end is effectively closed off during the shortened warm up period, reducing the drag that normally occurs as ram air is forced through the vehicle front end. Another advantage is reduced emissions achieved by quicker catalytic converter heating.

Variations in the disclosed embodiment could made, all of which would still use only the pre existing fan 20 as the operative means. Most fundamentally, the fan 20 is used to selectively restrict the air flow through the vehicle front end, which it could do simply by being locked solidly against turning, as opposed to being allowed to freewheel, as it normally is. Reversing the air flow direction restricts the normal air flow even more, of course. Theoretically, although it would be difficult to achieve, a reversal mechanism could be provided even for a mechanically or belt driven fan. It might be possible to reverse the direction of the blades themselves, rather than the fan, to achieve the same effect of restricting or even reversing the air flow. The multi reverse speed capability is not absolutely necessary, but is something that could be fairly easily achieved, since fan drives often have multiple forward speeds, which can be translated into multiple reverse speeds with the simple polarity reversal disclosed. Therefore, it will be understood that it is not intended to limit the invention to just the embodiment disclosed.

What is claimed is:

1. In a vehicle having an engine through which liquid coolant circulates, an inlet opening in said vehicle through which outside ram air flows when said vehicle is traveling, which outside air also flows over said engine to cool said engine and the liquid coolant circulating within, a cooling fan between said engine and said inlet opening that normally moves air over said vehicle engine in the same direction as said ram air, and a heater through which a portion of said liquid coolant is circulated to warm the interior of said vehicle on demand, a method for shortening the warm up period for said liquid coolant from ambient temperature to a predetermined heater threshold temperature, said method comprising the steps of, determining, after vehicle engine start up, whether the liquid coolant has reached said heater threshold temperature, determining whether, after vehicle engine start up, vehicle interior heating has been demanded, and, restricting the outside ram air flow with the cooling fan when interior heating has been demanded but the liquid coolant has not yet reached said heater threshold temperature, so that said fan resists the ram air flow temporarily to reduce the ram air cooling effect on the engine and thereby reduce the time necessary for the engine coolant to reach said heater threshold temperature.

2. A method according to claim 1 in which the restriction of outside ram air flow is achieved by reversing the direction in which the cooling fan moves air.

3. A method according to claim 2, in which the direction in which the cooling fan moves air is reversed by reversing the direction in which the cooling fan turns.

4. A method according to claim 3, in which the direction in which the cooling fan turns is reversed by reversing the polarity of an electric motor that drives the cooling fan.

* * * * *